(12) United States Patent
Rosch

(10) Patent No.: US 6,490,688 B2
(45) Date of Patent: *Dec. 3, 2002

(54) PROCESS AND APPARATUS FOR REDUCING POWER USAGE IN MICROPROCESSOR DEVICES ACCORDING TO THE TYPE OF ACTIVITY PERFORMED BY THE MICROPROCESSOR

(76) Inventor: Winn L. Rosch, 20,000 Shaker Blvd., Shaker Heights, OH (US) 44122

( * ) Notice: Subject to any disclaimer, the term of this patent is extended or adjusted under 35 U.S.C. 154(b) by 0 days.

This patent is subject to a terminal disclaimer.

(21) Appl. No.: 09/873,764

(22) Filed: Jun. 4, 2001

(65) Prior Publication Data

US 2002/0069372 A1 Jun. 6, 2002

Related U.S. Application Data

(63) Continuation of application No. 08/494,021, filed on Jun. 23, 1995, now Pat. No. 6,243,820, which is a continuation of application No. 08/320,566, filed on Oct. 11, 1994, now abandoned, which is a continuation of application No. 08/080,578, filed on Jun. 21, 1993, now abandoned, which is a continuation of application No. 07/954,706, filed on Sep. 30, 1992, now Pat. No. 5,222,239, which is a continuation of application No. 07/387,341, filed on Aug. 28, 1989, now abandoned.

(51) Int. Cl.⁷ ................................................ G06F 1/32
(52) U.S. Cl. ...................................... 713/322; 713/600
(58) Field of Search ................................. 713/300–340, 713/600–601

(56) References Cited

U.S. PATENT DOCUMENTS

| | | | | | |
|---|---|---|---|---|---|
| 4,381,552 A | * | 4/1983 | Nocilini et al. | ............. | 365/227 |
| 4,819,164 A | * | 4/1989 | Branson | ..................... | 713/501 |
| 4,851,987 A | * | 7/1989 | Day | ........................... | 365/227 |
| 4,893,271 A | * | 1/1990 | Davis et al. | ................. | 365/227 |
| 5,142,684 A | * | 8/1992 | Perry et al. | .................. | 709/102 |
| 5,428,790 A | * | 6/1995 | Harper et al. | ............... | 713/322 |
| 5,495,617 A | * | 2/1996 | Yamada | ....................... | 713/323 |

\* cited by examiner

*Primary Examiner*—Sumati Lefkowitz
(74) *Attorney, Agent, or Firm*—Ward & Olivo

(57) ABSTRACT

A process and apparatus for preparing the process for reducing the power consumption of microprocessor-based devices by reducing the frequency of the oscillator governing the logical operation of the microprocessor during periods of use in which system performance is not critical. In one embodiment of the apparatus, the microprocessor is controlled by a monitor circuit operable with the microprocessor and operated by the variable frequency oscillator. In another embodiment a hardware monitor circuit is utilized and which tracks microprocessor instructions to determine periods of use when performance is not critical. The shift in oscillator speed is mediated by a flip-flop latch circuit connected between one or more clock oscillators and the oscillator input of the controlled microprocessor.

6 Claims, 2 Drawing Sheets

PROCESS AND APPARATUS FOR REDUCING POWER USAGE IN MICROPROCESSOR DEVICES ACCORDING TO THE TYPE OF ACTIVITY PERFORMED BY THE MICROPROCESSOR

This application is a continuation of application Ser. No. 08/494,021 filed on Jun. 23, 1995, now U.S. Pat. No. 6,243,820, which is a continuation of Ser. No. 08/320,566 filed on Oct. 11, 1994, now abandoned, which is a continuation of Ser. No. 08/080,578 filed on Jun. 21, 1993, now abandoned, which is a continuation of Ser. No. 07/954,706 filed on Sep. 30, 1992, now U.S. Pat. No. 5,222,239, which is a continuation of Ser. No. 07/387,341 filed on Aug. 28, 1998, now abandoned.

TECHNICAL FIELD

The present invention relates to a method and apparatus for reducing power consumption of a microprocessor based device which is designed to operate from a stored energy source so as to extend the useful life of the stored energy source and therefore the ability to use the microprocessor based device. More particularly, the invention relates to a method and apparatus which reduces the power usage of the microprocessor itself during periods of inactivity or where the full extent of the microprocessor's capabilities are not necessary for the tasks being performed on the device. The reduction in power usage of the microprocessor is accomplished automatically based upon determinations of such inactivity or other predetermined conditions.

BACKGROUND OF THE INVENTION

There are a growing number of portable microprocessor-based devices such as laptop computers, which are designed to run on batteries far from utility lines. In these systems, power consumption has been a primary factor limiting system design. Without adequate battery life, normal processing tasks cannot be completed in the operating time available. Consequently, most aspects of the design of portable microprocessor-based devices have been optimized to conserve battery power. The power required by display systems, disk memory, and support circuitry have all been reduced. The known methods used to conserve power are two: first, to develop components that consume less power, and second, to interrupt or suspend component operation during period's of inactivity. These two methods are effective for all components except the microprocessor itself.

Power savings have been achieved in display systems by the above two strategies. The technologies used for screen displays have shifted from those consuming large power such as cathode ray tube, light emitting diode, and gas-plasma displays, to those with more modest power requirements, principally liquid crystal displays with or without backlighting. In addition, circuitry has been introduced to microprocessor-based devices to automatically shut off the screen, thereby conserving the power that it would use during lengthy periods of system inactivity.

Inactivity is typically determined by the absence of change in the data displayed on the screen or typed at the keyboard of a microprocessor-based device. The power consumed by disk drives has been reduced by using newer designs that are smaller and more energy efficient. In addition, hard disk drives, which normally consume power continuously because their magnetic media must be kept constantly spinning, have been devised which automatically stop their rotation after a predetermined period of microprocessor-based device inactivity. Inactivity is determined by the absence of commands to store data on or retrieve data from the storage medium.

Although these steps have helped to extend the usefulness of portable microprocessor-based devices, there has also been a trend to put increasingly powerful microprocessors into the machines. This exacerbates the battery power drain because more powerful microprocessor-based devices are more complicated, have more internal circuitry, and naturally consume more energy. For example, the Intel 80386 microprocessor comprises about 375,000 separate internal transistors; the newer 80486 comprises over a million, and even newer devices in the future will necessarily be comprised of even larger numbers.

Microprocessor power reduction has been achieved in some portable microprocessor-based devices such as those based on the 8088 and 80286 made by Intel Corporation by using special designs based on low-power Complementary Metal Oxide (CMOS) semiconductor technology, which is an inherently more power-efficient technology than other common semiconductor technologies. As a result, the power required by the microprocessor in such devices is not as large a fraction of the total power required by the entire microprocessor-based system.

However, the more powerful the microprocessor, the greater the fraction of system power resources must be devoted to its operation. The 80386 microprocessor, for instance, can consume five to eight watts, which is more than the total consumption of all the circuitry and components in a less powerful microprocessor-based device combined. Yet more powerful portable microprocessor-based devices, such as those based on the Intel 80386 and other advanced designs already use CMOS internal circuitry. The effects of utilizing more powerful microprocessors such as the Intel 80386 can be seen in one known portable lap-top computer utilizing the 80386 microprocessor which will have a typical operatic time of ½ hour before the battery life of the device is exhausted. This assumes that the computer is being used, At least to some degree, for computing tasks which will consume more power than the simple house keeping functions of the microprocessor. In the known laptop computer, the microprocessor is operated at a relatively slow speed of 12.5 MHz., to try and extend the useful life of the device, but also results in non-efficient operation of the device.

Moreover, the other traditional power saving techniques cannot be applied to the microprocessor. The microprocessor cannot be stopped during periods of inactivity. When the microprocessor stops its operation, the microprocessor-based device itself stops operating and is unable to detect when to resume operation when activity is resumed. Also as mentioned before, the microprocessor is never completely inactive. In all practical microprocessor-based devices, the microprocessor constantly engages in housekeeping functions. It continuously executes instructions to monitor the data-input devices, such as sensors or keyboards, as well as its input and output ports for new data input.

This monitoring process typically involves repeatedly executing a looping string of instructions. Stopping the operation of the microprocessor would halt the execution of those instructions necessary for monitoring the system, depriving the microprocessor of the ability to restart itself. Consequently, all current portable microprocessor-based devices must necessarily keep the microprocessor operating at all times.

It is also recognized that the power consumed by a microprocessor is directly related to the frequency of the oscillator driving it. During normal operation, the circuitry inside a microprocessor is constantly active: transistors continuously change state to execute logic operations as governed by the oscillator. Each change of state necessarily consumes a fixed and predetermined amount of power. The more often state changes take place; the more power is consumed by the microprocessor. On the other hand, reducing the oscillator speed also degrades the data processing ability of the microprocessor, contrary to the primary design goal in using a more powerful microprocessor which is to improve performance through higher operations speeds. Thus, unfortunately, the consequence of greater microprocessor speed, and better, more desirable performance characteristics, is greater power consumption.

There are also known in the prior art computers and other devices which are capable of multi-speed operation such is found with a "turbo" function associated with some personal computers. These devices essentially operate at a normal operating speed under most circumstances but may be changed to operate at a higher speed for compatibility with software which is speed critical. In order to change the operating speed in these devices, a switch or instruction given by the user through the keyboard or other input device will manually convert the speed of operation dependent upon the user requirements. In such a system, the multi-speed operation does not reflect upon power usage of the device as such devices are not designed to be portable and run from a battery or other stored energy source.

SUMMARY OF THE INVENTION

Based upon the foregoing, it is a main object of the invention is to reduce the power consumption of microprocessor. Based devices through the application of a specific process and apparatus to perform said process which reduces the frequency of the oscillator driving the microprocessor automatically during the periods in which it is performing non-critical operations. That is, microprocessor speed reduction during periods in which all of the-data processing ability of the microprocessor-based device is not demanded.

It is another object of the invention to provide a method of reducing the power consumption of a microprocessor-based device wherein the microprocessor itself is utilized to determine periods of inactivity or other predetermined conditions to reduce the microprocessors operating speed accordingly.

It is yet another object of the invention to provide the process and apparatus to reduce the power consumption of a microprocessor-based device by utilization of an external circuit which-may be incorporated into the device to determine periods of inactivity or other predetermined conditions to reduce the operating speed automatically.

A further object of the invention is to provide a method and apparatus to reduce the power consumption of a microprocessor-based device which utilizes the occurrence of critical instructions or non-critical instructions or the reoccurrence of non-critical instructions to determine periods of activity or inactivity respectively, from which the operating speed of the device may be automatically changed accordingly.

These and other Objects are realized using the apparatus of the present invention which may be comprised of three parts in addition to the typical circuitry of a microprocessor-based device: a monitoring module, an oscillator latch, and a source of multiple oscillator frequencies.

The monitoring module may be implemented either as a defined process running on an unmodified microprocessor such as the Intel 80386 (or any improved future microprocessor design), as a hardware circuit connected to the data lines of this or any other microprocessor, or as a hardware code internalized inside the microprocessor.

The monitoring module may serve the functions of determining periods of non-critical use and the onset of critical use of the microprocessor. Periods of non-critical use are determined by the lapse of a predetermined time period without the occurrence of a critical defined command (specific interrupts or other predetermined instructions) or the repetition of a pattern of non-critical instructions for a given number of iterations (for example, instructions for polling a keyboard, parity-checking a spreadsheet, or polling sensor devices). The onset of critical use is determined by the occurrence of certain defined interrupts or instructions in the sequence read by the microprocessor.

The monitoring module controls a bi-state logic latch, the second part of the apparatus which selects between two sources for the oscillator frequency to be delivered to the microprocessor. When the latch receives an indication of critical use from the monitoring module, it selects the higher oscillator frequency. Alternatively, when it receives an indication of non-critical use, it selects the lower oscillator frequency.

In its most elementary form, the source of multiple oscillator frequencies is a standard oscillator circuit coupled to a simple frequency divider. Such a design assures that the two oscillator frequencies are constantly synchronized. More design freedom is afforded by using two separate, independently-operating oscillators, which need not be related in frequency. In this case, however, the oscillator latch must incorporate additional logic to match oscillator cycles to maintain an acceptable duty cycle during the switching period.

BRIEF DESCRIPTION OF THE DRAWINGS

The objects and advantages of the present invention as well as the various embodiments and their operation will be more clearly understood with reference to the following detailed description in conjunction with the accompanying drawings, wherein.

DETAILED DESCRIPTION OF THE INVENTION

Figure 1:
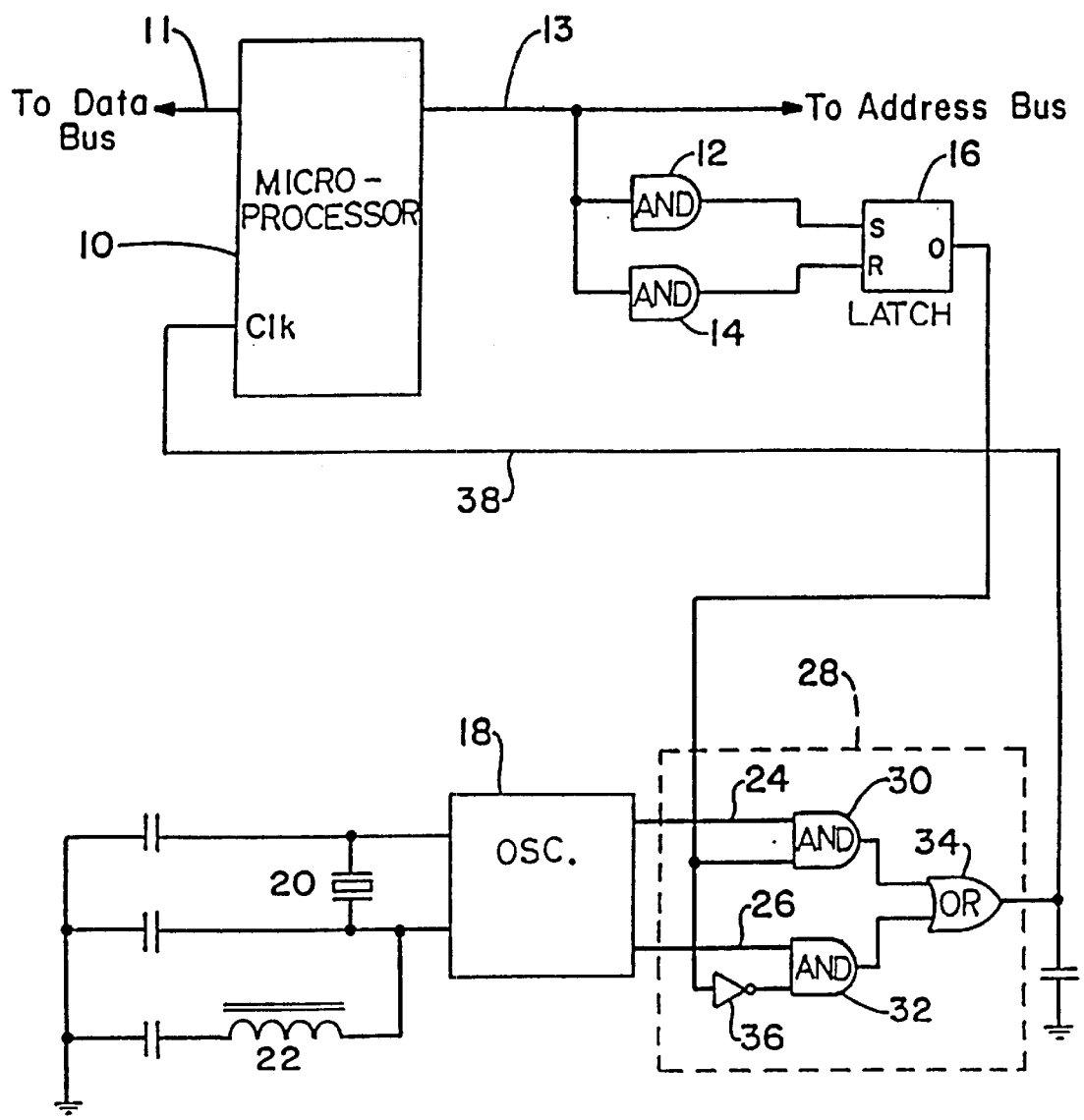
FIG. 1 shows a particular implementation of the invention using a process running on the controlled microprocessor to determine operating speed.

Referring now to the drawings, one embodiment as shown in FIG. 1, includes a microprocessor (10), such as an Intel 80386, which is conventionally connected to the memory and other circuitry of a microprocessor-based device through data ports coupled to the data bus of the device at 11. The multiple-AND gates (12) and (14) are connected to the address lines of the microprocessor at 13. Each gate monitors separate addresses generated by the microprocessor which represent a request for high-speed operation or low speed operation. These gates drive a set/reset latch (16) so that a logical high from gate (12) latches a high output from the latch (16) and a logical high from gate (14) resets the output of latch (16) low. Through addressing constraints, both gates (12) and (14) are prevented from being high simultaneously, avoiding error conditions. The output of latch (16) supplies the +HI/-LO signal for driving the speed latch to be subsequently described.

It is understood that other circuit configurations could be utilized to monitor designated address locations of the microprocessor to determine whether all of the data processing ability of the microprocessor is demanded based upon the determination of a critical instruction or the reoccurrence of non-critical instructions as previously described. The circuit utilized to monitor the operation of the microprocessor 10 can utilize commonly available circuitry provided on the microprocessor itself or alternately can have an external circuit placed in the substrate of the microprocessor chip itself or as a separate structure coupled to a microprocessor.

As shown in FIG. 1, the circuit utilized for monitoring the operation of the microprocessor 10 is coupled to the address bus of the system wherein instruction information can be placed in designated addresses to indicate the operation of the microprocessor. Alternatively, critical operation of the microprocessor may be determined by direct coupling of a monitoring circuit to the data bus of the system or directly to the data stream input or output from the microprocessor itself. As will be subsequently described, a list of predetermined critical instructions or non-critical instructions may be compiled and placed in memory within the system to which to compare for a determination of the microprocessor operation and subsequently the speed at which operation is required. The monitoring module may thus he coupled to memory of the system for access to such a list or include the list within memory provided therewith. In any case, the operation of the microprocessor 10 is monitored and the monitoring module will enable a request for high or low speed operation accordingly.

Oscillator (18) is a commercial integrated circuit, such as type 82384, that simultaneously develops two output frequencies CLK1 and CLK2 at 24 and 26 respectively from a single crystal (20), in this case CLK2 being twice the frequency of CLK1, but in any case CLK2 is greater and most conveniently a multiple of CLK1. The oscillator 18 and crystal 20 are coupled to a source of power through transformer 22 to generate the desired frequencies. Each of these outputs 24 and 26 are separately connected to a control or oscillator latch 28 comprising, in a simple form, a pair of AND gates 30 and 32 and an OR gate 34. The outputs 24 and 26 of the oscillator 18 are input into the an gates 30 and 32 respectively in the frequency control latch 28. The other input of high frequency select gate (30) is directly connected to the =HI/–LO signal generated by latch (16). The other input of low frequency select gate (32) is connected to the =HI/–LO signal through an invertor (36). The outputs of gates (30) and (32) are added together in OR gate (34), the output of which corresponds to the pulse train developed as CLK1 or CLK2 at 24 and 26 from the oscillator 18, depending on the state of the +HI/–LO signal. This output is connected to the clock input of the controlled microprocessor 10 at 38.

The circuitry as shown in FIG. 1 is very much simplified but will function to provide distinct frequencies for operation of the microprocessor as desired. Other circuitry to accomplish this result is contemplated by the present invention and could include a combination of AND gates and invertors which may function more efficiently and be an easier configuration to utilize.

Figure 2:
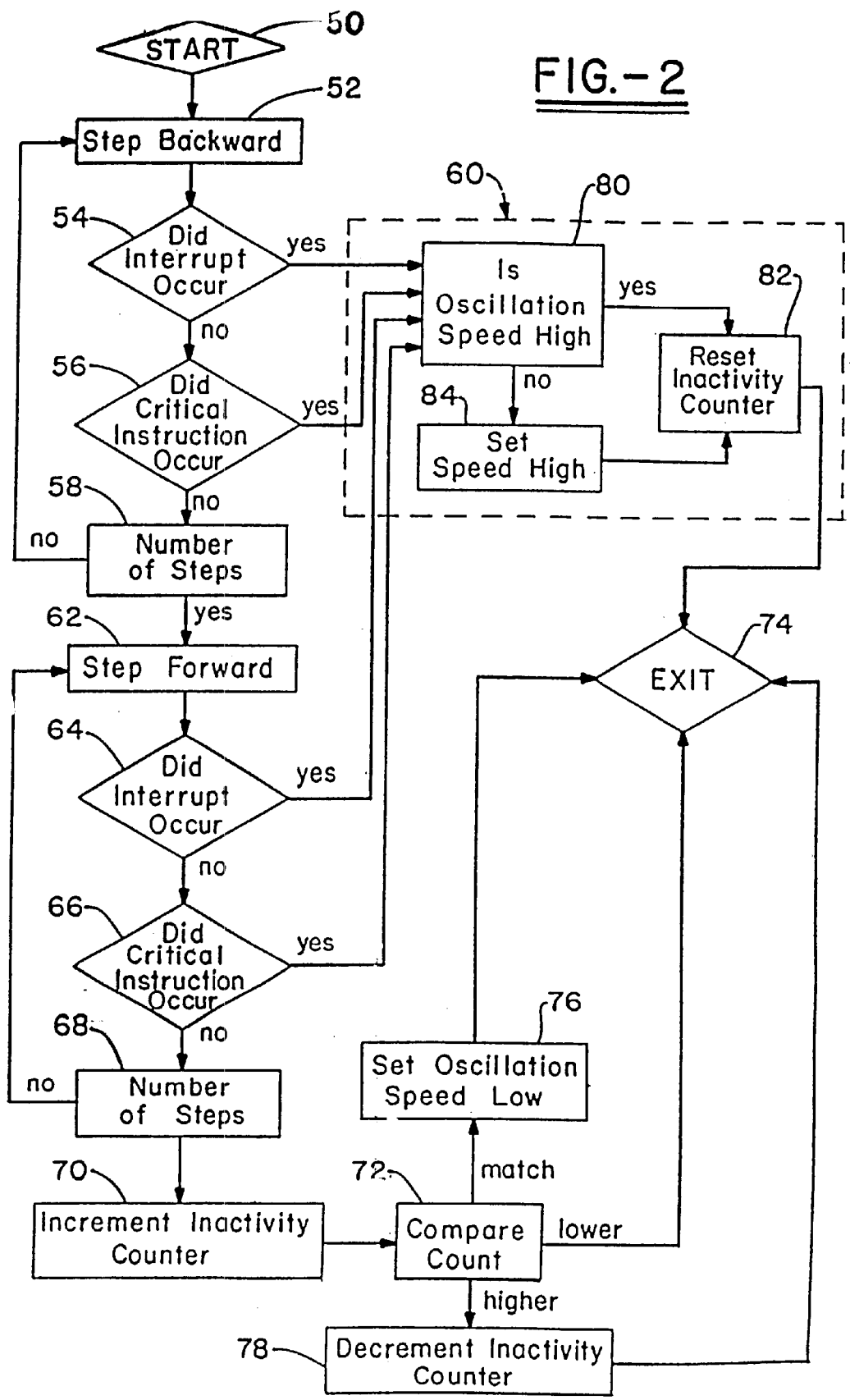
FIG. 2 is a flow chart of the monitor process for operating this system.

Turning now to FIG. 2, a flow chart of a monitor process which may be performed by the microprocessor in FIG. 1 is shown. This process is performed periodically as determined by an independent system timer that generates an interrupt, initiating the process. As an example, the monitoring function may be keyed to a time interrupt which in an IBM Personal Computer happens 18.2 times per second such that the monitoring function will occur continuously during operation of the device and will act to automatically reduce the speed of operation if the microprocessor is being utilized in a non-critical matter.

The independent timer and interrupt are part of the standard design of portable microprocessor-based devices.

Upon the occurrence of the timer interrupt, the process will start at a predetermined address in the instruction stream of the microprocessor at 50. The process will then search backward in the instruction stream, instruction by instruction, at 52 wherein each address searched will be checked to see if an interrupt or critical instruction occurred at 54 and 56 respectively. The process will thus verify whether the checked instruction is an interrupt other than the input or keyboard interrupt at 54. If so, it has found a critical instruction and immediately exits the timer interrupt service routine and performs the high speed exit routine at 60 to be subsequently described.

If the instruction is not an interrupt, the process will verify whether the instruction is one of the critical instructions at 56, that is, one that might be used in an operation for which performance is critical. If the instruction is critical, the process immediately exits the timer interrupt routine and runs the high-speed exit routine 60.

If neither critical condition is present, process loops back to step 52 to continue stepping back one instruction at time. After is has stepped back a predetermined number of instructions as compared at 58, it steps forward a similar number of instructions at steps 62, checking for interrupts at step 64, critical instructions at step 66, and looping as in the step-back procedure. If after evaluating all of these instructions the process locates no interrupts or critical instructions, it increments the inactivity counter at 70, and checks the counter for its predetermined critical value at 72.

If the critical value has not been achieved, the program ends the interrupt service routine at 74.

If the critical value has been reached, the program issues an instruction to trigger the low-speed latch at 76, then exits the interrupt service routine at 74.

If the critical value has been exceeded, the program decrements the inactivity counter at 78 in effect keeping its value constant, then the process ends the interrupt service routine at 74.

The high-speed exit routine 60 verifies whether the operating speed of the system is high at 80. If it is high, the routine resets the inactivity counter at 82. If the speed is low, it sets the speed latch high at 84 then resets the inactivity counter at 82, after which the program exits the interrupt service routine at 74.

It should thus be seen that when the monitoring routine searches a predetermined number-of instructions in the instruction stream of the microprocessor, a determination can be made whether operation of the microprocessor is critical necessitating high speed operation. As the interrupt service routine is conducted many times per second, the operation of the microprocessor will automatically be conducted at the proper operating speed in order to conserve battery power to its fullest extent. It should be evident that the system may also be manually operated by having the interrupt service routine placed in a predetermined address which can be selected to invoke a desired operating speed by the user. It is not thought that manual operation would necessarily be useful as under most circumstances, the user will not necessarily know when performance of the microprocessor is critical and this function can be accomplished automatically using the techniques of the present invention.

In the interrupt service routine as shown in FIG. 2, the microprocessor itself analyzes the instruction stream searching for an interrupt or critical instruction as described. The particular number of steps used in the searching routine is not critical and may be selected to provide optimum efficiency. A list of critical instructions for each family of microprocessors can be provided in a look up table which can be stored in memory such as a random access memory (RAM) or a read only memory (RAM) or anywhere that the microprocessor has access to such as list. Alternatively, an external processor may be provided having its own EPROM memory containing such a list or the list can be hard wired into the microprocessor chip itself. It should also be recognized that although the invention has been described with reference to a determination of an interrupt or critical instruction, the interrupt service routine can also operate to determine the occurrence or reoccurrence of a series of non-critical instructions which may indicate house keeping or other routine functions such as polling of the keyboard, parity checking or other similar functions.

The present invention thus provides a simple and yet effective way in which to reduce power consumption by a microprocessor and therefore of a microprocessor-based system which is operated from a stored energy source. As an example, a first oscillator frequency of 16 MHz. may be provided for high speed operation which may provide less than one hour of computing time due to depletion of a battery source utilized therewith. Utilizing this invention, a second oscillator frequency of 4 MHz. may be provided for low speed operation of the system during non-critical performance needs which will have the effect of extending the useful life of the system to over two hours under most circumstances. It is recognized that any operating frequencies may be provided for the particular tasks to be accomplished by the microprocessor-based system, such as for example a high speed operating frequency of 33 MHz. being the state of the art at the present time to a low speed operating frequency of 4 MHz. which is adequate for processing key strokes and the like. It can thus be seen that use of the present invention will extend the useful life of the microprocessor-based system easily by a factor of two or more from which the benefits should be apparent.

Although the present invention has been described with reference to a particular embodiment thereof, this is meant to be illustrative only and is not to be construed as limiting the scope of the invention. Various modifications and changes will occur to those skilled in the art without departing from the spirit and scope of the present invention as defined in the appended claims.

What is claimed is:

1. A process for automatically reducing the power usage of a microprocessor comprising the steps of:

continuously generating monitor interrupt signals for monitoring the operations of the microprocessor at predetermined intervals of time, searching within an instruction stream of the microprocessor for a plurality of instructions executed by the microprocessor upon the occurrence each of said monitor interrupt signals by means of a monitoring circuit, comparing said plurality of searched instructions with a predefined list of instructions stored in memory comprising wired connections to determine when at least one of said searched instructions constitutes a predefined instruction, supplying at least a first operation frequency to said microprocessor upon the occurrence of said predefined instruction, and a reduced second operation frequency to said microprocessor upon the non-occurrence of said predefined instruction, wherein the power usage of said microprocessor is reduced according to the occurrence or non-occurrence of said predefined instruction by reduction of the operation frequency supplied to said microprocessor.

2. A process as in claim 1 wherein said comparing is performed by wired logic.

3. A process as in claim 2 wherein the result of said comparing is stored for later usage by the microprocessor.

4. A process for automatically reducing the power usage of a microprocessor comprising:

designating certain portions of the code being executed by the microprocessor as critical code, providing for operating the microprocessor at two or more different clock frequencies, periodically interrupting the microprocessor determining whether the microprocessor was executing any of the said critical code in the interval prior to the interrupt, selecting said microprocessor clock frequency such that the microprocessor is set to operate at a higher frequency when the microprocessor was executing any of said critical code in the interval prior to the interrupt, and at a lower frequency when the microprocessor was not executing any of said critical code in the interval prior to the interrupt.

5. A system containing a microprocessor comprising:

a clock frequency source capable of providing one of two or more frequencies to the microprocessor, an interrupt service routine, a circuit which periodically interrupts the microprocessor causing the microprocessor to execute said interrupt service routine, a set of predefined instructions, a predetermined range of time values, said interrupt service routine determining whether said microprocessor had executed any of said predefined instructions within said predetermined range of time values prior to the interrupt, said interrupt service routine also providing for selection of one of said clock frequencies taking into account said determination.

6. A system as in claim 5 wherein monitor hardware provides information about the execution of predetermined instructions to said interrupt service routine.

* * * * *